United States Patent [19]

Emmons et al.

[11] 4,299,867
[45] Nov. 10, 1981

[54] AMBIENT HYDROCURABLE COATING AND ADHESIVES COMPOSITIONS

[75] Inventors: William D. Emmons, Huntingdon Valley; Wayne E. Feely, Rydal, both of Pa.

[73] Assignee: Rohm and Haas Company, Philadelphia, Pa.

[21] Appl. No.: 116,734

[22] Filed: Jan. 30, 1980

[51] Int. Cl.³ ............................................. B05D 3/02
[52] U.S. Cl. ................................ 427/377; 427/388.2; 525/203; 525/279
[58] Field of Search ............... 525/203, 279; 427/377, 427/388.2

[56] References Cited

U.S. PATENT DOCUMENTS 4,043,956  8/1977  Hutton et al. .................. 525/279 X Primary Examiner—Michael R. Lusignan
Attorney, Agent, or Firm—Lester E. Johnson

[57] ABSTRACT

The present invention is concerned with, as a hydrocurable composition, a mixture of an oxazolidine-functional polymer and a compound of a monomeric or polymeric character having a plurality of acryloxy groups. The first-mentioned polymer contains a plurality of pendant groups containing 2,2-dialkyl oxazolidine groups. The mixture of these two components can be stored under anhydrous conditions in a closed container without co-reaction so that a one-pot or one-package composition can be made up with many conventional ingredients of coating compositions other than aqueous components and stored without gelling until the time for application when the composition may be applied at ambient temperature and humidity whereupon reaction between the main two components mentioned above occurs in the film deposited and the film set up.

7 Claims, No Drawings

AMBIENT HYDROCURABLE COATING AND ADHESIVES COMPOSITIONS

BACKGROUND OF THE INVENTION

U.S. Pat. No. 3,037,006 discloses the production of N-(meth)acryloxyalkyl oxazolidines and N-(meth)acryloxyalkyl-tetrahydro-1,3-oxazines and vinyl addition polymers thereof useful for many coating, binder, or impregnating purposes, such as in mixture with other polymeric materials such as polyepoxides and glue.

U.S. Pat. No. 3,743,626 discloses hydrocurable compositions comprising a polyisocyanate and a mono-functional or poly-functional oxazolidine (including the polymers of U.S. Pat. No. 3,037,006) as defined in U.S. Pat. No. 3,743,626.

DESCRIPTION OF THE INVENTION

In accordance with the present invention, it has been discovered that one-pot compositions suitable for coating, impregnating, binding, and adhesive purposes can be made from a mixture comprising two components which react at ambient conditions of temperature (as low as about 10° C. to about 25° C.) and relative humidity (about 20% to 60% or even higher) to form cross-linked films but which can be mixed and stored under essentially anhydrous conditions without gelation until the time of use.

The composition of the invention comprises:

(1) a soluble addition polymer containing a plurality of pendant (and/or terminal) groups containing 2,2-dialkyl-oxazolidine or 2,2-cycloalkyloxazolidine groups, and (2) at least one polyethylenically unsaturated compounds, monomeric or polymeric in character, having at least two unsaturated ester groups of the general formula I

$$H_2C=C(H)-C(O)-O-\quad (I).$$

The ester groups of formula I are herein designated acryloxy. It has been found that the specific acryloxy group, as distinguished from the methacryloxy group, favors cure at lower ambient temperatures and for that reason the component (2) above is preferably a compound containing at least two acryloxy units.

Component (1) is an uncrosslinked linear vinyl addition polymer (the term "linear" being construed to include branched as well as straight chain linkages), or a mixture of such polymers, which may have an average molecular weight from as low as 600 number average to several hundred thousand number average, (e.g. 300,000 or even higher). The preferred molecular weight is from about 30,000 to 300,000 number average and the polymer is soluble in organic solvents or in component (2).

The soluble polymers of component (1) may be made by addition polymerization of those (meth)acryloxyalkyl oxazolidine monomers of formula I of U.S. Pat. No. 3,037,006 wherein the substituents $R^1$ and $R^2$ on the 2-position carbon of the oxazolidine ring are both alkyl groups having 1 to 12 carbon atoms or $R^1$ and $R^2$ are joined to form an alkylene group, i.e., tetramethylene or pentamethylene. As pointed out in the earlier patent, such monomers may be made by reacting diethanolamine with an aliphatic ketone and then, with the resulting 3-hydroxyethyl-2,2-dialkyl-oxazolidine (or -2,2-alkylene-), transesterifying a monomeric methyl (meth)acrylate. Examples of the ketones that may be used are cyclopentanone, cyclohexanone, acetone, methyl ethyl ketone, methyl n-propyl ketone, diethyl ketone, methyl isopropyl ketone, diisopropyl ketone, methyl isobutyl ketone, diisobutyl ketone, diamyl ketone, and di-(2-ethylhexyl) ketone.

The soluble polymers of component (1) may then be made by copolymerizing an oxazolidine monomer just described with at least one other monoethylenically unsaturated monomer having a terminal group $H_2C=C<$, such as styrene, methyl methacrylate, methyl acrylate, and other acrylic or methacrylic acid esters, such as ethyl (meth)acrylate, butyl (meth)acrylate, 2-ethylhexyl (meth)acrylate, acrylonitrile, vinyl toluene, etc. Copolymers of a mixture of about 1% to 25% by weight, preferably 3% to 7%, of an oxazolidine containing monomer with the balance to make 100% of at least one other monoethylenically unsaturated comonomer generally are suitable.

Instead of making the (meth)acrylate monomer containing the 2,2-dialkyl- or 2-alkylene-oxazolidine group and then copolymerizing it, component (1) may be made by transesterifying alkyl (meth)acrylate groups in a soluble polymer of an alkyl (meth)acrylate with the N-hydroxyethyloxazolidine intermediate obtained by the reaction of a ketone with diethanolamine.

Whatever method is used to prepare component (1), there should be a plurality of pendant oxazolidine-containing groups spaced along the linear polymer chain. There should be at least two equivalents of the oxazolidinyl groups per average polymer molecule and preferably the polymer molecule may contain as many as ten to a hundred such groups on the average, depending on the molecular weight. In general, the polymer preferably contains at least 4 such groups on the average. The other mers in the polymer may be selected on the basis of their contributions of hydrophobicity, flexibility, hardness, durability to weathering, e.g., resistance to ultraviolet light and resistance to water and other solvents, such as gasoline, in the final cured product.

Component (2) of the compositions of the present invention for coating, impregnating, and adhesive purposes, consists essentially of one or more polyfunctional compounds of monomeric or polymeric (condensation, addition, or vinyl addition types) character containing two or more unsaturated acryloxy groups of formula I hereinabove. Of these, the specific acryloxy groups are preferred.

By the term "polyfunctional acrylate", it is intended herein to refer to compounds containing two or more unsaturated acryloxy groups. Examples of such compounds that are useful as part or all of component (2) are:

ethylene glycol diacrylate
diethylene glycol diacrylate
propylene glycol diacrylate
trimethylene glycol diacrylate
neopentyl glycol diacrylate
1,3-butylene glycol diacrylate
1,4-butylene glycol diacrylate
1,6-hexamethylene glycol diacrylate
1,10-decamethylene glycol diacrylate
trimethylolpropane triacrylate
pentaerythritol tetraacrylate, and
pentaerythritol triacrylate.

There may also be used more complex types of polyfunctional acrylates obtained by reaction of a acryloxy-containing compound, such as acrylic acid, acrylyl halide, or a acrylic acid ester, with various compounds, such as hydroxy-containing alkyd resins, polyester condensates, or polyether condensates. These complex acrylated products may in some instances be termed "polymeric", since the acryloxy groups may be joined to a condensation polymer, e.g. a polyester or a polyurethane, to an addition polymer, e.g., a polyether, or to a vinyl addition polymer, e.g. a glycidyl acrylate polymer. Examples include:

(A) Urethane acrylates obtained by reacting isocyanate groups of a polyisocyanate, such as hexamethylene diisocyanate with a hydroxyalkyl acrylate, e.g. hydroxyethyl acrylate. These polyurethane polyacrylate monomers are disclosed in U.S. Pat. No. 3,297,745.

(B) Polyether acrylates obtained by esterification of hydroxy-terminated polyethers with acrylic acid as disclosed in U.S. Pat. No. 3,380,831.

(C) Polyesters having at least two acrylate groups obtained by esterifying hydroxyl groups with acrylic acid as disclosed in U.S. Pat. No. 3,935,173.

(D) Polyfunctional acrylates disclosed in U.S. Pat. No. 3,560,237, e.g. obtained by reaction of a hydroxyalkyl acrylate, e.g. hydroxyethyl acrylate, with any one of:

(a) Dicarboxylic acids having from 4 to 15 carbon atoms, (b) Polyepoxides having terminal glycidyl groups, (c) Polyisocyanates having terminal reactive isocyanate groups.

(E) Acrylate-terminated polyesters made from acrylic acid, a polyol having at least three hydroxyl groups, and a dicarboxylic acid (U.S. Pat. No. 3,567,494).

(F) Polyacrylates obtained by the reaction of acrylic acid with at least two epoxy groups of epoxidized drying oils, such as soybean oil, linseed oil, and the like, e.g. epoxidized corresponding drying oil fatty acid, an ester or amide thereof, or the corresponding alcohol, containing at least 2 epoxy groups. Such polyfunctional acrylates are disclosed in U.S. Pat. No. 3,125,592.

(G) Polyacrylates which are urethane or amine derivatives of the polyacrylated epoxidized drying oils, fatty acids and the like described in (F) and U.S. patent mentioned therein, obtained by the reaction of isocyanate(s) or amine(s) respectively with the polyacrylated epoxidized drying oils, fatty acids, and the like described in U.S. Pat. No. 3,125,592. The urethane and amine derivatives retain some or all of the acrylate groups and are disclosed in U.S. Pat. Nos. 3,876,518 and 3,878,077.

(H) Polyacrylates obtained by reaction of acrylic acid by addition to the epoxy groups of aromatic bisphenol-based epoxy resins as disclosed in U.S. Pat. No. 3,373,075.

(I) Polyacrylates obtained by the addition of acrylic acid to a linear vinyl polymer having pendant glycidyl groups, e.g. polymers of glycidyl acrylate or of vinyl glycidyl ether or vinyl glycidyl sulfide as disclosed in U.S. Pat. No. 3,530,100.

(J) Polyfunctional acrylates derived from acrylic acid anhydride and polyepoxides as disclosed in U.S. Pat. No. 3,676,398.

(K) Polyfunctional acrylate urethane esters obtained from the combining of hydroxyalkyl acrylates, a diisocyanate, and a hydroxyl functional alkyd condensate as disclosed in U.S. Pat. No. 3,673,140.

(L) Acrylate terminated urethane polyesters obtained by reaction of a polycaprolactone diol or triol with an organic polyisocyanate, e.g. a diisocyanate, and a hydroxyalkyl acrylate. Such products are disclosed in U.S. Pat. No. 3,700,643.

(M) Urethane polyacrylates obtained by reaction of a hydroxyl-containing ester of a polyol with acrylic acid and a polyisocyanate, such as those described in U.S. Pat. No. 3,759,809.

The disclosure in the patents mentioned above in each of paragraphs (A) through (M) are incorporated herein by reference insofar as they disclose the polyacryloxy-containing compounds and the processes of making them.

Preferred polyfunctional unsaturated compounds of the "complex" type above for use in component (2) are the acrylic acid adducts to polyepoxides in which the epoxy group is attached to adjacent carbon atoms, that is the epoxy groups is a vic-epoxy group. The polyepoxide may be any epoxidized vegetable or animal oil having ten or more carbon atoms in the fatty acid component and sufficient unsaturation to provide at least two epoxy groups in the epoxidized oil. Drying oils or semi-drying oils such as linseed oil or soybean oil are especially useful for epoxidation and subsequent acrylation. The polyepoxide to be acrylated may be any resin-forming polyepoxide having at least two terminal groups of the formula,

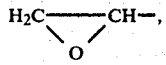

obtainable by reacting epichlorohydrin and a polyhydroxy phenol or an aliphatic diol or polyol, e.g. bisphenol A, glycerol, glycol, diethylene glycol, hexamethylene glycol and the like. Low molecular weight vinyl addition copolymers of glycidyl vinyl ether and of glycidyl acrylate may also be acrylated to form acrylated polyepoxides of component (2).

The pendant (and terminal, if any) groups of component (1) contain oxazolidine groups of the formula II wherein $R^1$ and $R^2$ are alkyl or, if directly attached to each other, are an alkylene group (tetramethylene or pentamethylene).

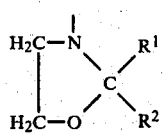

(II)

The nitrogen atom in the ring is tertiary, its third bond (shown above the N atom in formula II above) being attached to the carbon atom of the linkage connecting the group to the polymer chain. It has been found that in the absence of water these oxazolidine groups, when $R^1$ and $R^2$ are individually alkyl or, if attached together, alkylene, undergo no reaction with the acryloxy groups of component (2). The components (1) and (2) can be mixed under essentially anhydrous conditions together with other customary ingredients of non-aqueous character, and the resulting composition, suitable for coating, impregnating, bonding, adhesive, or other purpose can be stored in a moisture-proof container for an indefinite time without gelation that would result from the reaction of component (1) with component (2). However, when the composition is used, as by coating a surface for decorative, protective, or adherent purposes, that is exposed to moisture, even to ambient moist air commonly encountered having a relative humidity of as low as 20% to 60% or higher (even to 100%), and ambient temperature as low as 15° C. or as high as 25°–30° C., the oxazolidine groups of formula II hydrolyze to form the pendant groups of formula III and to liberate a ketone of the formula IV.

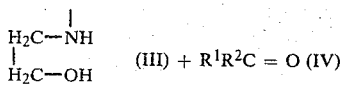

(III) + $R^1R^2C = O$ (IV)

The group III contains a secondary nitrogen which reacts with a acryloxy group of component (2) by way of the Michael addition reaction. By this reaction of the polymer of component (1) having pendant 2,2-dialkyloxazolidine groups with the polyfunctional acryloxy component (2), curing of the coating film occurs.

The relative proportions of components (1) and (2) may fall within a wide range depending upon the particular composition of each of the components. In general, the amount of unsaturated polyacrylate or polyacryloxy compound (component 2) that is used is sufficient to react with the secondary amine groups developed on hydrolysis of component (1) pendant oxazolidine groups to result in crosslinking upon ambient or elevated temperature cure to whatever extent is desired or needed to obtain the balance or combination of mechanical and resistant properties. The ratios of component (2) to component (1) advantageously may fall in the range of 0.2 to 3.5 equivalents of unsaturated acryloxy group in component (2) per equivalent of potential secondary amine nitrogen in component (1). Preferably they are present in proportions providing at least 1 to 2 acrylate unsaturation equivalents of component (2) for each potential equivalent of secondary amine developable on hydrolysis in component (1).

The component (2) not only serves to crosslink the composition but it may also be selected to alter the properties of the final cured product. This is especially true when one of the more "complex" polyfunctional acrylates, such as those mentioned in the paragraphs above-identified by the letters (A) and through (M), is used in the composition. There may also be used as component (2) a mixture of two or more of the polyfunctional unsaturated acrylates, again for the purpose of crosslinking and also modifying the final mechanical, optical, and chemical resistance properties.

Component (2) may include a vinyl addition polymerization inhibitor, such as hydroquinone, in small amounts, such as 0.01 to 0.2%.

The compositions of the present invention may be applied to form clear, protective, and decorative coating and/or impregnant films. However, they may also contain various additives other than those which react to form the crosslinked binder, body, or matrix of the film. Such additives may be plasticizers, such as dioctyl phthalate, pigments and inorganic fillers, such as glass, titanium dioxide, silica, barite, and calcium carbonate, coloring matter, such as dyestuffs, anticorrosive agents, and waterproofing or water-repellents, such as paraffin waxes.

The compositions of the present invention may be used for coating numerous substrates, such as those of metals, wood, glass, and plastics to produce thereon upon ambient curing, with or without acceleration thereof by heating, protective and/or decorative coating films which have an outstanding combination of properties, chemical resistance, rust-resistance, durability, e.g. to weathering, i.e. exposure to UV light, rain, etc., and hardness, toughness, flexibility, and other mechanical properties, including lubricity, frictional effects, etc. Also, the factors of low cost and toxicity involved in manufacture and use taken in conjunction with the properties obtainable on cure provide a versatility characterizing the compositions of the present invention such that in many instances they may beneficially be used in place of other ambient curing systems heretofore used. The compositions may also be used as binders for fibrous webs to form bonded non-woven fabrics by impregnation of the webs and curing.

In the following examples illustrative of the invention, the parts and percentages are by weight and the temperatures in Celsius degrees, unless otherwise specified. Also, ME represents "milliequivalent".

EXAMPLE 1

(a) 2,2-Dimethyl-3-(2-hydroxyethyl)-oxazolidine (DMHEOX)

A mixture of 526 g (5.0 moles) of diethanolamine, 581 g (10 moles) of acetone and 690 g (5.0 moles) of anhydrous potassium carbonate are allowed to stir for 20 hours. During the first two hours the solution temperature gradually increases to a maximum of 37° C. The mixture is filtered and the collected solid is washed with 500 ml of acetone. The filtrate and wash are combined, the solvent distilled off under reduced pressure, and the residue distilled under reduced pressure. There is obtained 543 g (75%) of a colorless liquid, b.p. 89°–92°/8 mm, $n_D^{26}$ 1.4614, neutralization equivalent 144.5 (calculated 145.2).

(b) 2-(2,2-Dimethyloxazolidinyl)-ethyl Methacrylate (DMOXEMA)

A 2-liter, 3-necked flask is equipped with a rubber serum cap, a mechanical stirrer, a Y-tube adaptor fitted with a thermometer and a 12-inch Vigreaux column. A solution of 145.2 g (1.0 mole) of 2,2-dimethyl-3-(2-hydroxyethyl)-oxazolidine and 1.37 g (11 mmoles) of p-methoxyphenol dissolved in 500 g (5 moles) of methyl methacrylate is heated to reflux and 25 ml of distillate is collected. A slow stream of fine air bubbles is introduced into the solution during reaction. The solution is cooled to 30° C. and 2.2 ml of a 25% sodium methoxide solution in methanol is added. Distillation at controlled stages from 80°–95° C. over a period of 2.5 hr. affords 221 g of distillate which contains 33.7 g of methanol (96% yield of methanol).

Solvent, excess reactants, and reaction side-product are removed by distillation under reduced pressure (20–30 mm) and the resulting concentrate is filtered. The filtrate is further concentrated by subjecting it to conditions of 125° C./15 mm in a wiping film distillation apparatus and then distilled twice in the wiping film distillation apparatus at 125° C./0.3 m and 110° C./0.5 mm, respectively.

There is added to the distillate, as an inhibitor to adventitious polymerization, 0.5 g of cupric chloride and 0.1 g of p-methoxyphenol and the distillate is redistilled in a conventional manner. There is obtained by this procedure 97.0 g (45.5% yield) of a colorless liquid, b.p. 78° C./0.5 mm, neutralization equivalent 214.3 (calculated 213.3).

(c) To a solution of 40.2 g of toluene and 26.2 g of methylisobutyl ketone is added 23.8 g of a mixture of monomers containing 60.8 g of n-butyl acrylate, 30.4 g of methyl methacrylate, 30.4 g of styrene, and 35.0 g of 2-(2,2-dimethyloxazidinyl)-ethyl methacrylate and 2.3 g of n-dodecylmercaptan. The resulting solution is heated to reflux temperature and a solution, in 5.3 g of toluene, of 0.85 g of a 50% solution of t-butylperoctoate (in mineral spirits) is added dropwise. After refluxing for 20 minutes an additional charge of 135.1 g of the mixture of monomers described above and a solution, in 13.1 g of toluene, of 4.79 g of a 50% solution of t-butylperoctoate (in mineral spirits) are added to the solution at reflux temperature over a period of 2 hours. When the addition is complete an additional charge of 1.25 g of a 50% solution of t-butylperoctoate (in mineral spirits) dissolved in 7.8 g of toluene is added and the solution is maintained at reflux temperature for an additional 30 min. before cooling. The resulting copolymer solution contains 0.63 ME/g amine as determined by titration, and has a solids content of 57.5%.

(d) Coating System

To 6.0 g of the solution obtained in Part (c), there is added 3.51 g of a 50% solution of Actomer X-80 ® (acrylated epoxidized soybean oil having an acrylate equivalence of 2.8 ME/g and practically no reactive residual epoxy content) dissolved in butyl cellosolve, at ambient temperature. The resulting solution is coated on Bonderite 1000 ® as a 7 mil wet film.

The coated panel is nearly tack-free after standing overnight at ambient conditions. It swells but does not dissolve when exposed to liquid methylene chloride for 15 min. indicating that crosslinking has occurred. The coating is clear and very glossy.

To a portion of the above-described solution remaining after coating (about 1.5 g) is added 0.005 ml of water. This solution gels on standing overnight. The remainder of the coating solution is kept in a dry stoppered bottle and is still fluid 7 days after bottling.

EXAMPLE 2

(a) 2-Ethyl-3-(2-hydroxyethyl)-2-Methyl-oxazolidine (MEHEOX)

A mixture of 315 g (3 mols) of diethanolamine, 432 g (6 moles) of methylethylketone, and 100 ml of cyclohexane is stirred and heated to reflux using a Dean-Stark trap to separate the water formed. The mixture is stirred and refluxed for a total of 31½ hours during which 54 ml of aqueous layer, 85% water and 15% methylethylketone by NMR, is collected (85% of the theoretical amount of water of reaction). The mixture is then concentrated and the residue distilled to give 373 g (78% yield) of product, b.p. 85°-88° C./2.5-3.0 mm Hg.

(b) 2-(2-Ethyl-2-Methyl 3-Oxazolidinyl) Ethyl Methacrylate (MEOXEMA)

A mixture of 2800 g (28 mols) of methyl methacrylate, 1114 g (7 mols) of 2-ethyl-3-(2-hydroxyethyl)-2-methyl-oxazolidine, 20 g of hydroquinone and 17.5 g (0.07 mol) of dibutyltin oxide is stirred and heated while a slow stream of dry air is passed thru the mixture. The vapor is fractionated using a 10 stage Oldershaw column equipped with an isothermal distillation controller set for 50% takeoff below 65° C. and 100% reflux when the temperature exceeds 65° C. After three hours, 83% of the theoretical amount of methanol has been collected and a precipitate begins to form in the reaction mixture. The mixture is cooled to room temperature and filtered. The solid is washed with methyl methacrylate and air-dried to give 8.5 g of a tan powder which contains 42% tin by elemental analyses. Excess methyl methacrylate is stripped from the filtrate and 1326 g of a mixture of product, MEOXEMA, and 2-ethyl-3-(2-hydroxyethyl)-3-methyl oxazolidine is distilled from the flask. This crude product is inhibited with 10 g of hydroquinone and redistilled through an eight inch Vigreaux column, again using an air sparge, to give 1007 g (63% yield) of product, b.p. 107°-109° C./1.8-2.0 mm Hg.

(c) Copolymer of Styrene and MEOXEMA (57.88/42.11)

To 250 g of xylene, maintained at reflux (138° C.), there is added continuously dropwise over a period of 4 hours a solution of 289.43 g of styrene, 210.57 g of MEOXEMA and 6.67 g of a 75% solution of t-butylperacetate in mineral spirits. The solution of monomers and catalyst is also sparged continuously with dry nitrogen during the 4 hour period of addition.

When the addition is complete, heating is continued for 0.5 hour. Then an additional charge of 0.67 g of a 75% solution of t-butylperacetate in mineral spirits is added and heating at reflux is continued for 1 hr. before cooling the completed resin to ambient temperature.

The product is a viscous light amber solution which contains 1.20 ME/g amine by titration.

(d) Coating with a Polyacrylate

To 10.0 g of the resin solution prepared in part (c), there is added 5.00 g of ethoxyethanol acetate and 6.14 g of a 50% by weight solution of a diacrylate ester of a liquid bis-phenol A epoxy resin (e.g. that available under the name Epocryl ® DRH-370) dissolved in ethoxyethanol acetate. After thoroughly mixing, a 5 mil wet film of the solution is cast on Bonderite 1000 ® steel panel by means of a draw bar coater.

The film is touch-dry after 1 hr. at ambient temperature.

After two weeks curing at 70° F./50% RH, the coating shows a KHN of 1 and a reverse impact of more than 150 in-lbs. The coating is not affected by ½ hr. exposure to fabric patches saturated with 10% aqueous sodium hydroxide solution and regular gasoline, and only slightly softened in the same period by acetone, methanol, ethyl acetate, toluene and 10% aqueous acetic acid solution.

EXAMPLE 3

(a) Copolymer of Styrene/n-BA/MEOXEMA

A solution of styrene/n-butyl acrylate/MEOXEMA in the molar ratio of 2/2/1 and containing 3.0 mole % t-butyl peroctoate initiator is added to toluene heated at 105° C. The procedure of example 2(c) is generally followed except that toluene is used at reflux instead of xylene and the peroctoate initiator is used in place of the peracetate initiator of the earlier example. The final solution is a pale yellow in color, contains 1.02 ME/g. of amine by titration and has about 70% solids.

(b) A coating composition is prepared by mixing an acrylated styrene-allyl alcohol copolymer (prepared as described in part (c) hereof) with the copolymer of part (a) hereof, the mixture being such as to provide in the mixture a 1:1 equivalence between (1) the unsaturated acryloxy groups of the acrylated styrene/allyl alcohol copolymer and (2) the amine of copolymer (a) as determined by titration. The mixture is diluted with toluene to a viscosity suitable for spreading with a coating knife and then phosphatized steel test panels (Bonderite ® 1000) are coated to provide a 5-mil thickness of the wet film. The panels are cured under ambient conditions for 24 hours and then heated at 60° C. for 24 hrs. The films have a Knoop Hardness No. (KHN) of 8.30, are clear and glossy and have a reverse impact of 120-140 inch-pounds.

(c) To a flask equipped with stirring, heating and sparging equipment, a Dean-Stark water trap, and a reflux condenser, there are charged 390 g. (2.0 equivalents based upon OH content) of a styrene/allyl alcohol copolymer (available commercially as Monsanto ® RJ-101), 500 g. of toluene, 138.2 g. (1.92 moles) of glacial acrylic acid, 0.60 g. of methylhydroquinone, and 7.6 g. (0.04 mole) of p-toluenesulfonic acid. The pressure in the reaction vessel is reduced to 500 mm Hg and the solution of reactants is heated to reflux (85° C.). Water formed by the esterification of hydroxyl groups of the hydroxyl-containing polymer by acrylic acid is distilled azeotropically with toluene and collected by means of the Dean-Stark trap. After 6 hrs. at reflux, 76% of the acrylic acid is consumed (titration) and continued heating does not increase conversion.

An excess of dry sodium carbonate is then added to neutralize free unreacted acid. After cooling, the solution is filtered, and then concentrated to 84% solids by vacuum-distillation of toluene. The final solution has a viscosity of 192,000 cps. and on analysis, it contains: 0.92 ME/g. OH; 2.55 ME/g. acrylate; and 2.60 ME/g. saponifiable ester.

EXAMPLE 4

(a) Copolymer of Styrene/2-ethylhexyl acrylate/MEOXEMA

A copolymer is prepared by the procedure of example 3(a) using the molar ratio of S/2-EHA/MEOXEMA of 2/1/1. The final solution is pale yellow and, by titration, is determined to contain 1.16 ME/g. of amine.

(b) A coating composition is prepared by the procedure of Ex. 3(b) except that the MEOXEMA copolymer of part (a) hereof is used in place of the copolymer of Ex. 3(a). The composition is cast into 5 mil wet films on steel test panels and cured as in Ex. 3(b). The cured films are clear and glossy, have a hardness (KHN) of 8.35, and on testing show a reverse impact of 50-60 inch-pounds.

EXAMPLE 5

(a) Copolymer of Styrene/MEOXEMA

A monomer mixture of styrene and MEOXEMA in the molar ratio of 7.9/1 is copolymerized by the procedure of Ex. 3(a) to produce a clear, viscous, pale yellow solution of copolymer which, by titration, is found to contain 0.62 ME/g. amine.

(b) A coating composition is made by the procedure of Ex. 3(a) except that the MEOXEMA copolymer of part (a) hereof is used in place of the analogous copolymer of Ex. 3(a) and the composition is coated on steel test panels to form 5-mil wet films which are cured as in Ex. 3(b). The cured films are clear and glossy, have KHN hardness of 20.4 and show a reverse impact of less than 2 inch-pounds.

Patch tests are used to determine the chemical resistance of the cured films obtained in Exs. 3(b), 4(b) and 5(b). The results are tabulated in TABLE I following:

NOTE: The first column of the table lists the chemical and in parentheses, the duration of time the film is subjected to the chemical. The following key indicates the meaning of the entries.

NC = no change
S = softening
SS = slight softening
H = hazy
SB = small blisters
D = delaminated

TABLE I
(CHEMICAL RESISTANCE)

| Chemical | (Duration in hrs.) | Example (3b) | (4b) | (5b) |
|---|---|---|---|---|
| 10% aq. Acetic Acid | (24) | SS | SB | NC |
| Glacial Acetic Acid | (2) | D | D | SS |
| Xylene | (0.5) | SS | SS | NC |
| Methanol | (0.5) | NC | S/H | NC |
| Acetone | (0.5) | SS | SS | SS |
| Regular Gasoline | (0.5) | SS | SS | NC |
| Toluene | (0.5) | D | D | SS |

All of the films obtained in Exs. 3, 4, and 5 become tack-free in less than one hour as determined by means of the Zapon test using a 500 g. load. The coating solutions obtained in Exs. 3, 4 and 5, parts (b), when kept in sealed vials to prevent contact with moisture, appear unchanged after 2-4 weeks storage at ambient temperature.

EXAMPLE 6

A water-reduced coating is prepared as follows:

To 10.0 g of a 60% solution of a copolymer of styrene and MEOXEMA (3:1 molar ratio) in Propasol ® B is added 0.3 g of Capcure ® 65 (a 65% solution of a nonionic surfactant in methanol available from Diamond Shamrock Co.) and 3.11 g of Celrad ® 3200 polyacrylate (available from Celanese Corp.). This solution is stirred rapidly while 5.0 g of water is added dropwise. The resulting tan creamy emulsion is coated as a 5 mil wet film on Bonderite 1000 panels. The film becomes transparent after 10 minutes at ambient temperature and is virtually tack-free after 30 minutes. After 16 hours drying at ambient temperature, the film is clear and glossy with a very slight "orange-peel" surface pattern. Also, the film is swelled but not dissolved by methylene chloride, which property indicates that crosslinking has occurred.

EXAMPLE 7

(a) To 150.0 g of xylene, heated at 105° C. with stirring and maintained under a nitrogen atmosphere, is added dropwise over a period of 4 hrs. a solution of 323.0 g of isodecyl methacrylate, 27.05 g of MEOXEMA and 10.50 g of t-butyl peroctoate. When the addition is complete an additional charge of 1.05 g of t-butyl peroctoate is added to the stirred polymerization reaction mixture and the temperature is maintained at 105° C. for 30 minutes before cooling the product.

The product is a clear, light yellow solution, contains an amine titer of 0.21 ME/g and has a Mw of 27,900 and a Mn of 7360 (determined by gel permeation chromatography).

(b) Adhesive Composition

To 10.0 g of the solution obtained in part (a) above is added 0.89 g of a solution of 10.0 g of 1,6-hexanediol diacrylate dissolved in 90.0 g of xylene. The resulting solution is coated as a 2 mil wet film on Bonderite ® 1000 panels. After drying overnight at ambient temperature, a very tacky and adhesive coating is obtained.

The coated film is suitable for use as a pressure sensitive adhesive and adheres to nylon, polypropylene and polyethylene terephthalate films. The coating is swelled but not dissolved by methylene chloride, which property indicates that crosslinking has occurred.

The coating is then stored in a stoppered vial at room temperature. After 30 days of storage, the appearance of the solution is unchanged from its initial appearance.

What is claimed is:

1. An ambient condition hydrocurable composition, suitable for coating and impregnating purposes, comprising a mixture of
   (1) a soluble addition polymer containing a plurality of pendant groups containing a 2,2-dialkyl-oxazolidine or a 2,2-cycloalkyloxazolidine group and
   (2) at least one polyethylenically unsaturated compound, monomeric or polymeric in character, having at least two unsaturated acryloxy groups,
the ratio of component (2) to component (1) being in the range of 0.2 to 3.5 equivalents of unsaturated acryloxy group in component (2) per equivalent of potential secondary amine nitrogen in component (1).

2. A composition according to claim 1 wherein the mixture of components (1) and (2) is anhydrous.

3. A composition according to claim 1 wherein the component (1) is a copolymer of a mixture of monoethylenically unsaturated monomers comprising at least 1% by weight of N-(meth)acryloxyalkyl-2,2-dialkyloxazolidine or N-(meth)acryloxyalkyl-2,2-alkyleneoxazolidine.

4. A composition according to claim 1 wherein the relative proportions of component (2) to component (1) are such as to provide at least one equivalent of acryloxy unsaturation in component (2) to each equivalent of amine nitrogen in component (1).

5. A method of applying a composition according to claim 1 which comprises the step of spreading the composition on a surface of a substrate to be coated, impregnated, or both, at ambient temperature and relative humidity whereupon the moisture in the atmosphere causes hydrolysis of the oxazolidine ring with liberation of a ketone and the conversion of the tertiary amine nitrogen of the ring to a secondary amine nitrogen and crosslinking of component (1) by Michael addition to the acryloxy groups in component (2) occurs at ambient temperature.

6. A method according to claim 5 wherein the ambient temperature cure is supplemented by a cure at elevated temperature up to about 70° C.

7. A composition according to claim 1 wherein the relative proportions of component (2) to component (1) are such as to provide at least about one to two equivalents of acryloxy unsaturation in component (2) to each equivalent of amine nitrogen in component (1).

* * * * *